United States Patent
Schwent

[11] 3,971,208
[45] July 27, 1976

[54] GAS TURBINE FUEL CONTROL

[75] Inventor: Glennon V. Schwent, Tempe, Ariz.

[73] Assignee: The Garrett Corporation, Los Angeles, Calif.

[22] Filed: Apr. 1, 1974

[21] Appl. No.: 456,492

[52] U.S. Cl. .................... 60/39.03; 60/39.27;
60/39.28 R; 60/39.29; 60/39.16 R; 60/262
[51] Int. Cl.² ........................................... F02C 9/02
[58] Field of Search ............. 60/39.27, 39.28, 39.29;
415/27, 28

[56] References Cited
UNITED STATES PATENTS

| | | |
|---|---|---|
| 3,006,145 | 10/1961 | Sobey .......................... 60/39.27 X |
| 3,172,259 | 3/1965 | North .......................... 60/39.29 X |
| 3,255,586 | 6/1966 | Hennig ......................... 60/39.27 X |
| 3,523,423 | 8/1970 | Young .......................... 60/39.16 R |
| 3,638,422 | 1/1972 | Loft ............................ 60/39.28 R |
| 3,646,753 | 3/1972 | Colman ......................... 60/39.27 |
| 3,686,860 | 8/1972 | White .......................... 60/39.25 |
| 3,710,576 | 1/1973 | Evans .......................... 60/39.03 |
| 3,797,233 | 3/1974 | Webb ........................... 60/39.28 R |

*Primary Examiner*—Clarence R. Gordon
*Attorney, Agent, or Firm*—Jack D. Puffer; Albert J. Miller

[57] ABSTRACT

A fuel control system for a gas turbine engine providing single lever thrust control and closed loop fuel flow surge valve positioning system.

12 Claims, 3 Drawing Figures

GAS TURBINE FUEL CONTROL

BACKGROUND OF THE INVENTION

This invention relates to fuel control systems and more particularly to fuel control systems for gas turbine engines of the type providing vehicle propulsion.

Fuel control systems for modern gas turbine engines of the type used in vehicle propulsion involve complex computation of a variety of engine parameters to provide proper metering of the fuel to the engine combustor. Such systems are additionally complex for engines having multiple spools as opposed to single spool engines. The parameters which must be sensed and operated upon to provide proper engine fuel flow are in part; spool speeds, engine inlet temperature, ambient pressure, turbine inlet temperature, compressor discharge pressure and surge bleed valve position. The problem is further complicated in the case of small engines, principally used in general aviation aircraft where the crew consists of only a pilot and co-pilot and no flight engineer is available to control and monitor engine performance. In this case, it is required that engine control and monitoring be as simple and automatic as possible so as not to require an excessive amount of the crew's time. One of the principal problems to be avoided in the operation of such engines is the condition of compressor surge in which a discontinuity of fluid flow through the compressor causes violent fluid pressure fluctuations which can cause damage to the engine and eventually total destruction.

Heretofore, fuel control systems for gas turbine engines have been designed to be conservative in order to ensure protection against surge. That is, total output power would be sacrificed in order to ensure safe engine operation. The present invention overcomes these disadvantages by providing a fuel control system for a multiple spool gas turbine engine in which the power output is controlled by a single lever in which the power output is a linear function of lever position. Engine parameter monitoring scheduling and computation of optimum fuel flow are provided by an automated electronic system. In particular, the surge valve control is arranged to provide maximum thrust at each power lever setting by means of a closed loop control involving fluid flow control logic and the surge valve position signal. The operator need only position the lever to indicate the percent of maximum thrust desired and the system will provide maximum safe acceleration to that power level and maintain the level until the power level is adjusted to a new setting.

SUMMARY OF THE INVENTION

The fuel control system of the present invention provides engine scheduling by relating the operation of parameters of this system to a schedule ratio of $W_f/P_3 \sqrt{\theta_{t_2}}$ where $W_f$ if fuel flow in pounds per hour and $P_3$ is compressor discharge pressure, and $\sqrt{\theta_{t_2}}$ is a correction factor for inlet temperature. The fuel flow required by the engine for any given operating condition may be defined in terms of the value of this ratio.

For each engine operating condition or operating parameter there is provided a schedule of $$\frac{W_f}{P_3 \sqrt{\theta_{t_2}}}$$

versus the corrected low pressure spool speed in rpm. The operating conditions for which schedules are provided are engine starting, acceleration schedule, surge schedule, minimum fuel schedule, deceleration schedule. All these schedules with the exception of the start schedule are defined in terms of the low pressure spool speed. The start schedule is dependent upon high pressure spool speed. There is provided a logic system utilizing these schedules and the above listed engine parameters to provide the optimum fuel flow in accordance with the power lever setting and to regulate the surge valve position for the safe efficient engine operation. The start schedule, acceleration schedule and surge schedule as well as power lever position, turbine inlet temperature and spool speed mismatch information are fed to a logic selector whose output is the lowest value of these inputs. The output of the lowest-wins logic is fed to a logic which selects the highest parameter. In addition to the lowest-wins input, the minimum fuel schedule and deceleration schedule are also inputted to this selector. The output of this highest-wins selector controls the fuel flow regulator providing correct fuel flow to the fuel nozzles of the engine combustor. The surge valve which bleeds air from the low pressure compressor when there is danger of compressor surge is controlled by a surge valve control logic whose inputs are the surge schedule, power lever position and a feedback of the fuel flow signal to the fuel flow regulator. The surge valve control logic is such that when fuel flow is limited by the surge schedule, the surge valve control is signalled to open the valve a given number of ratios of $$\frac{W_f}{P_3 \sqrt{\theta_{t_2}}}.$$

After allowing time for the surge valve to be stroked, the fuel flow is increased by an amount allowed by the additional surge valve opening. When the fuel flow is a predetermined amount above the surge valve schedule, the surge valve is directed to close a specified amount and the fuel schedule may be reduced accordingly. Under steady state conditions the engine speed match is such that no compressor bleed is needed.

In accordance with modern engine fuel control technology, the mechanical three-dimensional cam is eliminated by the electronic control system and its logic described in more detail in the description of the preferred embodiment herein. Thus is can be seen that this invention provides a fuel control system for a gas turbine engine in which the power selection is made by means of a single lever motion and by predetermined scheduling of engine operating regimes using closed loop surge valve control logic whereby there is provided an efficient and easily operated system which provides maximum safe engine performance under all operating conditions.

DESCRIPTION OF THE PREFERRED EMBODIMENT

Figure 1:
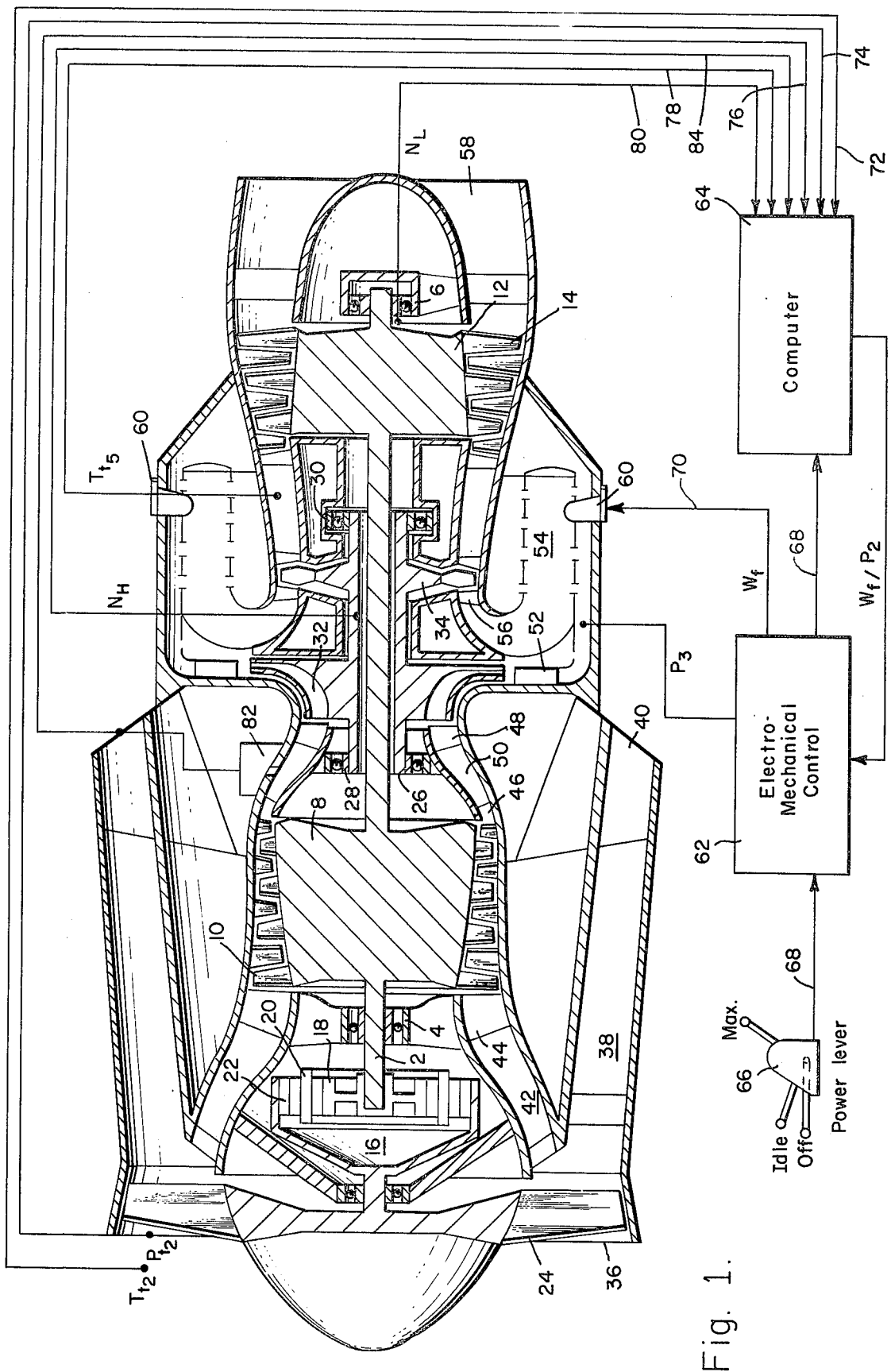
FIG. 1 is a sectional view of a gas turbine engine and block diagram of the control system.

The following symbols shown in the drawing and used in the specification have their meanings indicated in the table below:

$W_f$ = Fuel flow, pounds per hour
$T_2$ = Inlet temperature
$T_5$ = Inter turbine temperature
$\sqrt{\theta_{t_2}}$ = Inlet temperature correction factor
$P_2$ = Inlet pressure
$P_3$ = Compressor discharge pressure
$N_h$ = High pressure spool speed
$N_l$ = Low pressure spool speed Referring now to FIG. 1, there is shown in section a typical multispool gas turbine engine in which the control is used. The engine shown is a two-spool turbofan engine having a low pressure spool and a high pressure spool and a geared front fan. The shaft of the low pressure spool shown at 2 is supported in bearings 4 and 6 for rotation therein. Mounted on the low pressure shaft is an axial compressor 8 having four rows of axial blades generally designated at 10. The low pressure turbine which drives the shaft is shown generally at 12 and has three rows of axial blades shown generally at 14. At the forward end of shaft 2 there is provided a planetary gear set shown generally at 16. This set consists of a sun gear 18 attached to the low pressure shaft, planet gears 20 and a ring gear 22 which drives the fan 24 at the front of the engine.

The shaft of the high pressure spool is shown generally at 26. The shaft is supported in the engine housing by bearings 28 and 30. The high pressue spool rotating elements consist of a centrifugal compressor shown at 32 which is driven by a single row axial turbine 34. In accordance with known technology, air is taken in at the front of the engine at inlet 36 and is divided at the back side of the fan into two flow paths. The first path is the fan by-pass shown generally at 38. Air inducted into this channel is exhausted through fan exhaust 40. The second duct is shown generally at 42, air is drawn into duct 42 over inlet guide vanes 44 and into compressor 8. The discharge from the low pressure compressor 8 is directed by guide vanes 46 and 48 at each end of a duct 50 into the inlet of the centrifugal compressor 32. From compressor 32 air is discharged into duct 52 and into an annular combustor 54. The air is heated in the combustor by burning fuel and air therein and exhausted over guide vanes 56 and expanded through the high pressure turbine 34. The hot gas is further expanded through the low pressure turbine 12 and exits through the thrust nozzle 58. Fuel is injected into the annular combustor 54 through a series of fuel nozzles shown generally at 60 and placed circumferentially around the exterior of the combustor.

There is also shown in FIG. 1 a block diagram of the control system showing generally the inputs and outputs therefor. The control system is divided generally in two principal elements. The electromechanical control is shown at 62 and the electronic computer portion at 64. The inputs to the electromechanical control are the power lever position signal derived from power lever 66 and transmitted to the computer through conduit 68. The output of the electronic computer 64 which is the ratio $W_f/P_c$ and compressor discharge pressure $P_3$ are the other inputs to the electromechanical control. The output of this control 62 is the fuel flow indicated by $W_f$ transmitted over conduit 70 to the fuel nozzle 60. The engine parameters which are fed to the computer 64 are $T_{t2}$ inlet temperature transmitted over the line 72, $P_{t2}$, inlet pressure transmitted over line 74, high pressure spool speed $N_h$ via line 84, $T_{t5}$ inter-turbine temperature via line 78 and low pressure spool speed $N_l$ transmitted by line 80. The output of the computer is the ratio $W_f/P_c$ as discussed previously above and position and control signals for the bleed valve 82 which are transmitted over line 76. The system will be described in more detail in connection with FIG. 2.

Figure 2:
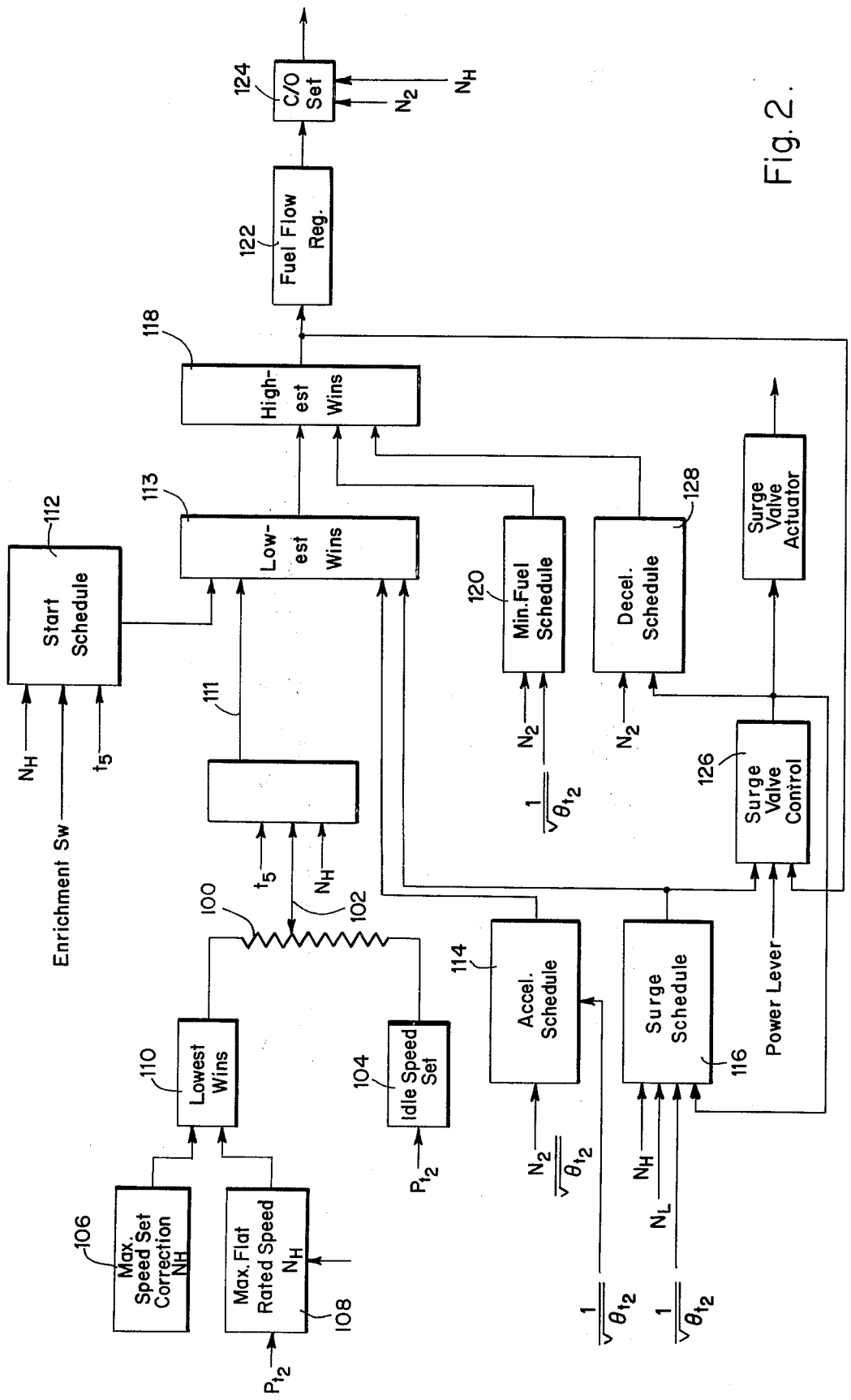
FIG. 2 is a block diagram schematic of the system of the invention.
Figure 3:
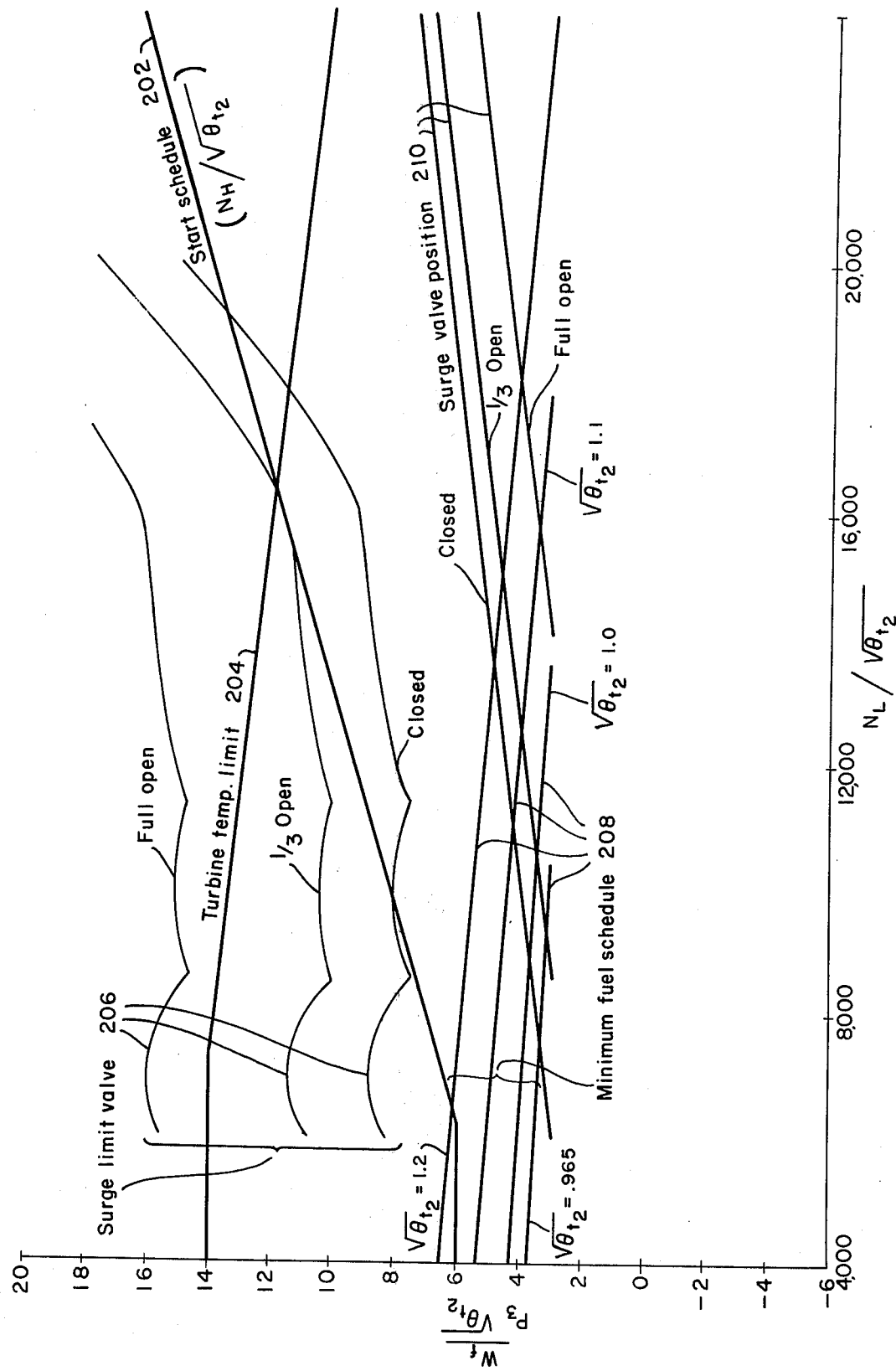
FIG. 3 is a composite plot of fuel schedules used in the system.

Referring now to FIG. 2, there is shown a detailed schematic of the fuel control system of the instant invention. The primary input to this system is the output of the power lever position potentiometer shown generally at 100. Its output is determined by the position of potentiometer wiper 102 on the potentiometer. The inputs to the potentiometer are at one end the idle speed setting shown at 104 and at the other end the maximum speed set correction for the high pressure spool shown at 106 and the maximum flat-rated speed correction of the high pressure spool at 108. Whichever of these values is the lowest is selected by the logic 110 and fed to the opposite end of the potentiometer 100. The output of the power lever position is combined with inner turbine temperature $T_5$ and high pressure spool speed into a single output which is fed into the lowest wins selector. Also fed to this selector is the output of the start schedule shown generally at 112 and having the inputs of $N_h$, $T_5$ and an optional manually operated enrichment switch which may be selected by the pilot if desired. The start schedule plot of fuel flow versus $N_l$ is shown in curve 202 of FIG. 3. Another input to the lowest wins logic is the acceleration schedule shown at 114. A plot of this schedule is shown in FIG. 3 at 204. The other input to the lowest wins logic is the surge schedule shown at 116 plotted in FIG. 3 at 206. The surge schedule system receives the inputs of $N_h$ and $N_l$ and the feedback signal from the output of the surge valve controller. The operation of this subsystem will be discussed in the operation section herein. Of the four inputs discussed above into the lowest wins logic, the lowest of these values is selected and is introduced as an input to a second logic selector 118 which is characterized by selection of the highest value of its input parameters as its output signal. The other inputs to this selector are the minimum fuel schedule shown at 120 and plotted in FIG. 3 at 208 for various values of the correction factor $\sqrt{\theta_{t_2}}$. Logic 118 selects the highest of these inputs which is then transmitted to the fuel flow regulator 122 which regulates flow to the fuel nozzles of the combustor. Intermediate the fuel flow regulator and the engine is a cutoff solenoid valve 124 which is controlled by spool speed signals and prevents overspeeding of the engine by shutting fuel flow in the event of an overspeed condition.

The surge valve control constitutes a separate subsystem within the fuel control system for measuring and controlling the position of the surge valve for bleeding air from the engine between the compressor stages for preventing compressor surge. The surge valve control system shown generally at 126 receives an input from the surge schedule 116 from the power lever position indicator as well as feedback from input to the fuel flow regulator 122. The output for the surge valve control is a schedule shown at 210 in FIG. 3. This output is a ratio of $$\frac{W_f}{P_3\sqrt{\theta_{t_2}}}$$

and varies with the position of the surge valve. This output is fed back to the surge control surge schedule 116 and also to the deceleration schedule 128 and also activates the surge valve actuator for opening and closing the valve. The system as described herein utilizes a surge valve having three discreet positions rather than a fully modulated valve. The valve positions are closed, one-third open and full open. The schedules shown in FIG. 3 reflect these valve positions where appropriate.

OPERATION OF THE SYSTEM

Engine starting is initiated by a single switch which energizes the starter and the combustor-ignition system. The fuel valve 122 is opened when the operator moves the power lever to the idle position. When $N_h$ equals 50 percent of maximum starter and ignition are switched off. The engine accelerates according to the start schedule with overtemperature protection by the monitoring of $T_5$ in the start schedule.

In the steady state condition the selected position of the power lever sets $N_h$ to provide desired thrust with the output thrust being generally in direct proportion to the power lever position. The maximum high pressure spool speed $N_h$ set by the power lever is limited by either the physical speed at the temperature limit of the engine or the flat rating thrust of the engine. These limits are set in at 106 and 108, respectively, in FIG. 2. During acceleration of the engine above idle, the fuel flow parameter is limited by either of two schedules; the acceleration schedule which is a function of $N_l$ and inlet total temperature or by the surge schedule of section 116 in which the fuel parameter is controlled as a function of $N_l$, $N_h$ and the surge bleed position. During deceleration of the engine, fuel flow is limited by the minimum fuel parameter which functions to prevent the high speed spool from decelerating too quickly and causing an excessive spool mismatch which will lead to low pressure compressor surge. This schedule is a function of $N_l$ and the bleed valve position. At low spool speeds the minimum fuel parameter prevents burner blow out.

The low pressure compressor surge bleed valve is controlled by the surge valve control and is dependent upon the power lever position, present fuel flow and the surge schedule. In order to prevent compressor surge, it is necessary to limit the fuel flow and hence the rate of change of the low pressure spool speed. When the fuel flow to the engine is limited by the surge fuel schedule of 116, a signal is generated to open the bleed valve to a first fixed position. After a time period to allow for valve stroking, the fuel schedule is enriched to the value permitted by the new bleed valve area. If the surge schedule is still limiting the fuel flow, the bleed valve is opened fully and the fuel schedule is increased appropriately after time allowed to open the valve. After the engine has accelerated and the surge schedule is higher than the fuel flow, by the amount of the increased schedule, the valve is actuated to close to the next smaller opening. When the surge schedule is greater than the amount of enrichment due to the intermediate position the surge valve is closed completely and the system operates in the steady state condition. The surge schedule is shown at 206 of FIG. 3. In nominal steady state conditions the schedule is as shown on the curve marked "closed." If the one-third valve is open the schedule is raised 2.2 ratios of $$\frac{W_f}{P_3\sqrt{\theta_{t_2}}}.$$

If the valve is fully opened, the schedule is raised an additional 4.4 ratios. The indicated surge schedule is compared to the output of the system. If the surge schedule is 0.1 ratio above the output, the one-third valve is opened. After approximately a 0.1 second delay, the output schedule is raised 2.2 ratios. If the surge schedule is still less than 0.1 ratios above the output, the valve is fully opened and the schedule is raised another 4.4 ratio. As the engine accelerates and the output becomes less than the surge schedule operating by 4.6 ratios the surge valve is closed two-thirds of the way. As the output becomes less than the surge schedule by 2.4 ratios, the valve is then finally closed completely.

Thus it can be seen that this surge valve logic system allows only that amount of compressor bleed as is required to prevent surge and bleed valve area is continually adjusted as the engine speed changes. This interaction of the fuel flow and surge valve position in a closed loop servo system prevents excessive bleed and its resulting loss of engine efficiency.

There is herein provided a fuel control system for a gas turbine engine which provides simplicity in operation allowing for control by a single operator and which provides safe and efficient engine operation with adequate safety margin but without wasting of fuel in over conservative controls.

While specific embodiments of the invention have been illustrated and described, it is to be understood that these embodiments are provided by way of example only and that the invention is not to be construed as being limited thereto but only by the proper scope of the following claims.

What is claimed is:

1. A fuel control system for a gas turbine engine, said engine having at least one fluid compressor means, a combustor means, at least one turbine means and a surge valve for bleeding air from the output of said compressor means, said control system comprising:
   means for measuring a plurality of engine operating parameters and generating signals representative thereof;
   a first plurality of schedule means for receiving selected engine parameter signals from said measuring means and providing an output signal according to a predetermined schedule, said output signal varying according to variations in said engine parameter signals;
   first selection means for selecting the lowest value of the outputs of said first schedule means and providing an output signal representative thereof;
   a second plurality of schedule means including surge schedule means for receiving selected engine parameter signals and providing an output signal according to a predetermined schedule, said output varying according to variations in said parameter signals;
   second selection means for selecting the highest value of the output of said second schedule means and first selection means and providing a fuel flow signal representative thereof;

fuel regulator means for receiving the fuel flow signal from said second selection means for regulating fuel flow to said engine;

surge valve control means for sensing the fuel flow signal from said second selection means and the position of said surge valve for adjusting said surge valve position to increase the rate of compressor bleed if the fuel flow signal is limited by the engine surge schedule and for decreasing the rate of compressor bleed if the fuel flow is less than the surge schedule by a predetermined amount.

2. The fuel control system of claim 1 wherein said plurality of engine parameters comprises engine rotational speed, power lever position, turbine inlet temperature, and compressor discharge pressure.

3. The fuel control system of claim 2 wherein said first plurality of schedule means comprises an engine acceleration schedule, surge schedule, start schedule and power lever position signal and said second plurality of schedules comprises a minimum fuel schedule and a deceleration schedule.

4. The fuel control system of claim 3 wherein the input signals to said surge valve control means include, surge schedule signal, power lever position signal and fuel flow signal from said second selection means; the output of said surge control means is connected at an input to said deceleration schedule, said surge schedule and to a surge valve actuator.

5. The fuel control system of claim 4 wherein said engine is a two-spool engine having first and second compressor means and first and second turbine means, said first compressor means and said first turbine means comprising a first spool at said second compressor and said second turbine means comprising a second spool and said engine rotational speed parameter comprises first spool speed signal and a second spool speed signal and the input to said surge schedule comprises first spool speed signal second spool speed signal and the output of said surge valve control means.

6. A fuel control system for a gas turbine engine wherein the control parameter is $W_f/P_c$ where $W_f$ equals fuel flow in pounds per hour and $P_c$ equals compressor discharge pressure in pounds per square inch, said system comprising a plurality of scheduled signals having output signals proportional to $W_f/P_c$ versus engine speed according to a predetermined schedule, said system comprising:

a first signal selector means whose output is the lowest of its input signals;

a power lever position signal generator connected to the first signal selector means for generating a control parameter signal proportional to the power lever position;

an acceleration schedule signal generator connected to said first signal selection means for generating a control parameter signal for limiting engine acceleration;

a surge schedule signal generator means connected to said first signal selector means for generating a control parameter signal for limiting fuel flow according to surge valve position and engine speed;

a second signal selector means having as one of its signal inputs the output of said first signal selector means, the output of said second signal selector means being the highest value of its signal inputs, said output being connected to a fuel flow regulator for regulating fuel flow to said engine;

a minimum fuel schedule signal generator connected to the input of said second signal selector for generating control parameter signal for limiting the minimum fuel flow to said engine;

a deceleration schedule signal generator connected to the input of said second signal selector means for generating a control parameter signal to limit engine deceleration; and a surge valve control means connected to the output of said second signal selector means and to the output of said surge schedule signal generating means and said power lever position signal generator said surge valve control means generating output signal for varying the output of said surge schedule generating means and said deceleration schedule signal generating means.

7. Fuel control system of claim 6 wherein the output of the power lever position signal generator is limited by a turbine inlet temperature or engine speed.

8. A fuel control system for a gas turbine engine, having a control parameter of $W_f/P_c$ wherein $W_f$ equals fuel flow in pounds per hour and $P_c$ equals compressor discharge pressure, said system comprising:

first signal generator means for selecting desired engine power output level;

second signal generator means for generating a first plurality of control parameter signals representative of selected engine performance limits;

first selection means having as its output the lowest of said first and second signal generating means;

third signal generator means for generating a second plurality of control parameter signals representative of other selected engine performance limits;

second selection means having as its output the higher control parameter signal of said first selection means and third signal generating means;

compressor bleed valve control means;

means for modifying the output of said second selector means in response to the output of said compressor bleed valve control means.

9. The fuel control system of claim 8 wherein the means for modifying the output of said selector means comprises:

means for comparing the output of said second selector means with a predetermined bleed valve schedule;

means for increasing the output of said second selector means when said bleed valve schedule exceeds the output of said second selector means by a predetermined amount, and means for increasing the bleed valve open area for increasing compressor bleed when the output of said second selector means is limited by the bleed valve open area.

10. A control system for a gas turbine engine for controlling fuel flow and bleed valve position said system comprising:

means for generating a fuel flow signal representative of desired fuel flow;

means for generating a surge valve position schedule signal, said schedule signal indicating a predetermined relationship between engine speed and allowable fuel flow;

means for selecting the higher of the fuel flow signal or said surge valve position signal, said selected signal being representative of the fuel flow supplied to the engine;

servo means for adjusting the surge valve position to increase engine bleed if the surge schedule is limiting the selected signal and increasing the fuel flow signal accordingly;

means for adjusting the surge valve position to reduce engine bleed if the surge valve position signal is above the selected signal by the amount of the fuel flow increase.

11. A method of controlling fuel flow to a gas turbine engine, said engine having at least one compressor-turbine spool and a compressor bleed surge valve, said method comprising:

generating a fuel flow power signal indicative of desired engine output;

generating a first plurality of fuel schedule signals including an engine surge schedule signal, said schedule signals being derived from engine operation limits;

selecting the lowest of said power signal or said first fuel schedule signals;

generating a second plurality of fuel schedule signals derived from engine operating limits;

selecting the highest schedule signal of said second schedule signals or first selector signal;

comparing said selected highest signal and said surge schedule signal;

opening said surge valve to increase compressor bleed if the surge schedule signal is limiting said selected highest signal wherein opening said surge valve raises the surge schedule limit; and increasing said selected highest fuel signal to the level permitted by the increased surge schedule.

12. A method of controlling fuel flow to a gas turbine engine, said engine having a surge valve for providing compressor bleed, said method comprising:

generating a fuel signal indicative of desired engine power;

generating a surge schedule signal, said signal providing a fuel flow limit dependent upon engine speed and surge valve position;

providing a surge valve control logic for controlling said surge valve;

comparing the actual fuel flow signal, desired fuel flow signal and the fuel flow signal allowed by surge schedule;

actuating said surge valve control logic for opening the surge valve and increasing the actual fuel flow if the surge schedule is limiting the actual fuel flow; and closing the surge valve and decreasing the fuel flow if the surge schedule signal exceeds the desired fuel flow by a specified amount.

* * * * *